United States Patent [19]
Takahashi

[11] Patent Number: 5,748,601
[45] Date of Patent: May 5, 1998

[54] OPTICAL HEAD FOR USE WITH HIGH DENSITY OPTICAL DISK HAVING MULTI-VALUED DATA RECORDED IN THE DISK

[75] Inventor: Jun-Ichi Takahashi, Tokyo, Japan

[73] Assignee: NEC Corporation, Japan

[21] Appl. No.: 728,304

[22] Filed: Oct. 9, 1996

[30] Foreign Application Priority Data

Oct. 13, 1995 [JP] Japan .................................... 7-265514

[51] Int. Cl.[6] .................................................... G11B 7/00
[52] U.S. Cl. .................... 369/112; 369/118; 369/44.24
[58] Field of Search ................................. 369/109, 112, 369/118, 44.23, 44.24, 44.37, 103, 110, 116, 120, 124

[56] References Cited

U.S. PATENT DOCUMENTS 5,526,338  6/1996  Hasman et al. ........................ 369/109

FOREIGN PATENT DOCUMENTS 0661698   7/1995  European Pat. Off. .
0683484  11/1995  European Pat. Off. .
63-306546 12/1988  Japan .
2-31329    2/1990  Japan ............................... G11B 7/00
6060467    3/1994  Japan .
8153337    6/1996  Japan .
08185640   7/1996  Japan .

OTHER PUBLICATIONS

"Pit Depth Encoded Memories" Marx et al; Department of Electrical Engineering California Institute of Technology; pp. 41–42; date unknown.

Primary Examiner—Paul W. Huber
Attorney, Agent, or Firm—Hayes, Soloway, Hennessey, Grossman & Hage, P.C.

[57] ABSTRACT

An optical head is provided for use with a high density optical disk having multi-valued data recorded in the optical disk. The optical head includes a pinhole member having three pin-holes in a focal plane of an optical system for supplying a zero-order and a pair of first-order diffracted beams to a photodetector, thereby improving pit-depth detection resolution. The optical head improves resolution in the direction of depth of focus without reducing beam spot diameter.

3 Claims, 4 Drawing Sheets

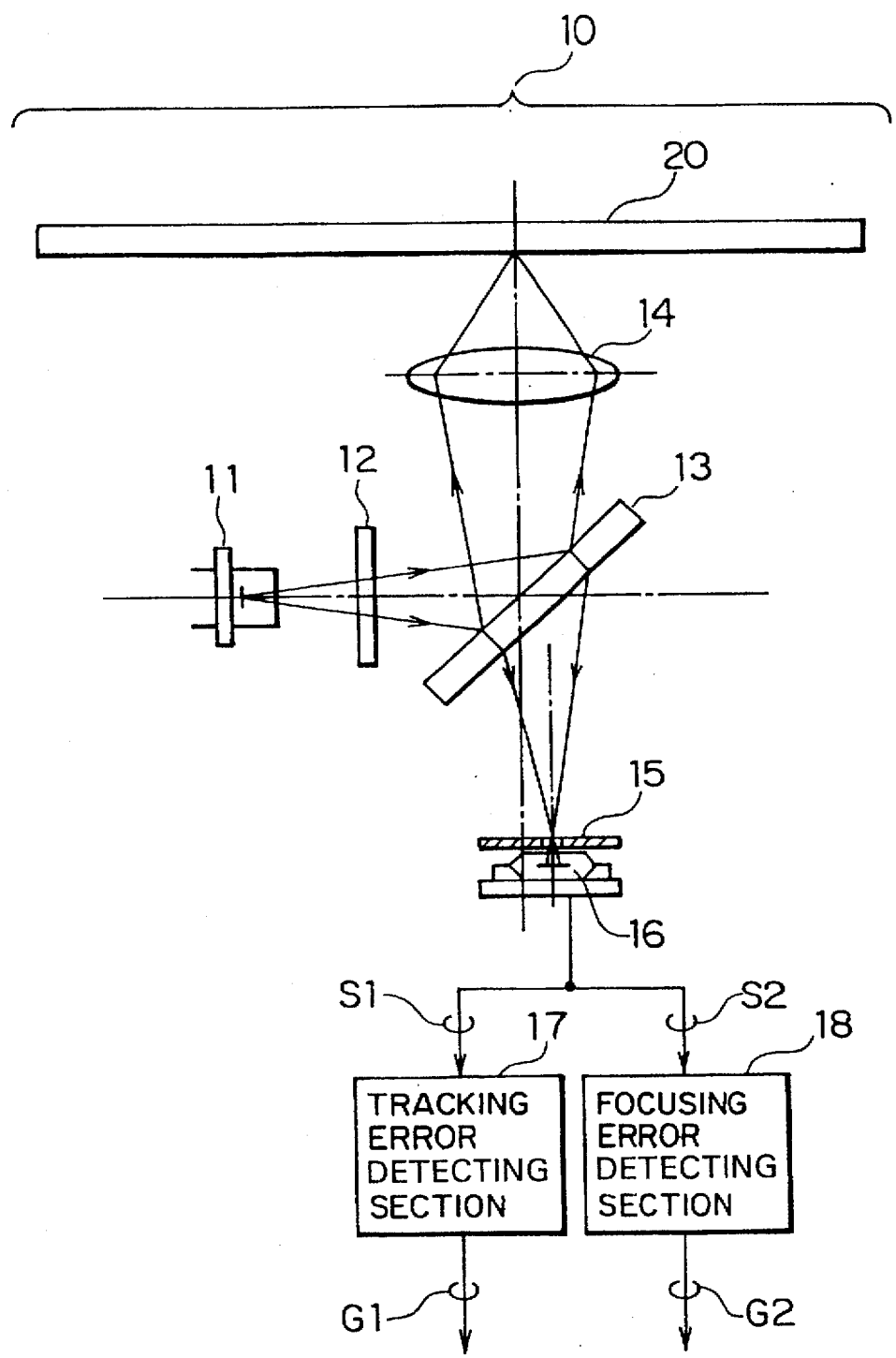

OPTICAL HEAD FOR USE WITH HIGH DENSITY OPTICAL DISK HAVING MULTI-VALUED DATA RECORDED IN THE DISK

BACKGROUND OF THE INVENTION (a) Field of Invention

The invention relates to an optical head, and in particular, to an optical head for use in a disk drive for permitting reading of and writing to a high density optical information storage medium or optical disk file.

(b) Description of the Related Art

A conventional optical head is illustrated in FIG. 1. The optical head comprises a semiconductor laser 21 acting as a light source which emits a light beam, a diffraction grating 22 which diffracts the light beam, a beam splitter 23 which reflects the light beam at an angle of 45° toward an optical disk file 20, an objective lens 24 which focuses the light beam onto the optical disk file 20, and a photodetector 26 which receives light reflected from the optical disk file 20 and delivers a detected electric signal. In use, the optical head is mounted on an optical disk drive, not shown in the drawing.

As described, the light beam emitted from the semiconductor laser 21 is transmitted through the diffraction grating 22 to form three light beams including a zero-order and a pair of first-order diffracted beams, the latter being used for detecting tracking error. These beams are reflected by the beam splitter 23 and then focused by objective lens 24 onto the recording surface of the optical disk file 20.

Each diffracted beam is reflected by the optical disk file 20 so as to pass through the objective lens 24 and the beam splitter 23 so as to be incident on a light receiving surface of the photodetector 26 and be converted into a detected electric signal.

During the above described process, the zero-order diffracted beam reflected from the optical disk file 20 is caused to produce astigmatism during the transmission through the beam splitter 23 before it is incident on the photodetector 26 in order to allow detection of the focusing error signal, which is utilized in focusing a microscopic optical spot, thereby following oscillation of the surface of the optical disk file 20. Each diffracted beam is formed by the diffraction grating 22 so as to be irradiated onto the optical disk file 20 in order to establish disposition of the diffraction grating 22 by rotation so that the positive and negative first-order diffracted beams are located on opposite sides about the zero-order diffracted beam. The positive and negative first-order diffracted beams are used to detect tracking error signal which is used to follow the eccentricity of the optical disk file 20.

To achieve an increase in storage capacity, it is general practice in such an optical disk to increase storage density of the optical disk file in the direction along the track and to reduce the size of the zero-order diffracted beam or optical spot which irradiates the optical disk file 20 to increase the track density.

The size of the optical spot which irradiates the optical disk file 20 is determined based on the wavelength ($\lambda$) of the light beam and the numerical aperture (NA) of the objective lens 24. It is possible to reduce the size of the optical spot by reducing the wavelength ($\lambda$) of the light beam or increasing the numerical aperture (NA) of the objective lens. However, there is a theoretical limit to the diameter of the optical spot imposed by the design of the light source and the objective lens.

As another technique to increase storage capacity, there have been proposals including using a multi-layer structure as the recording surface for the optical disk file such as is proposed in Patent Publication NO. JP-A-1990-031,329, and using multi-value encoded pits. Examples of optical disk files which utilize multi-valued data include one having a pit configuration including a plurality of pit depths corresponding to individual different values of multi-valued code.

To perform a read/write operation from and to the optical disk file which uses such a multi-valued code, it is necessary to improve resolution of the light beam which is projected from the optical head toward the recording surface of the optical disk file. Improvement of resolution in a direction perpendicular to the direction of irradiation of the light beam or in the direction along the recording surface of the optical disk file is accomplished by reducing numerical aperture (NA) of the objective lens or the wavelength ($\lambda$) of the light beam. However, when such measures are taken, the depth of focus of the light beam becomes small, thereby reducing the diameter of the focused light beam, and also thereby disadvantageously degrading sensitivity of detection of the optical spot which is used for detecting the tracking error and focusing error signals, or rendering such detection difficult to achieve.

SUMMARY OF THE INVENTION

It is an object of the invention to solve the problems involved in the conventional optical head and to provide an optical head for use with a high density disk having multi-valued data in the disk file, which object is realized by improving resolution in the direction of the depth of focus substantially without reducing the diameter of the optical spot being focused.

According to the invention, there is provided an optical head comprising a light source for emitting a light beam, a diffraction grating for diffracting the light beam to generate at least a pair of first-order diffracted beams, a first optical system for focusing the first-order diffracted beams onto an optical disk file to generate a pair of reflected beams from the optical disk file, a second optical system for focusing the reflected beams at respective focal points to generate a pair of focused beams, a pin-hole member having a pin-hole corresponding to each of said focused beams, a photodetector having at least a pair of detecting sections each for receiving a corresponding one of the pair of focused beams passing through respective pin-holes to generate detected signal, and control means for tracking the optical head based on the detected signal.

In accordance with the invention, limiting of diffraction is effected by improving resolution in the direction of the depth of focus when receiving light beams and by substantially doubling, when detecting the light beams, the resolution in the direction of the depth of focus, thereby permitting difference in the depth of detected individual pits to be reduced to one-half a corresponding value of the prior art.

Accordingly, as compared with a conventional optical disk in which binary data is recorded, difference in the pit depth can be selected to be equal to one-half that of the prior art, whereby data can be read from the optical disk according to the invention, in which quaternary data is recorded, with twice as high a recording density as in the prior art.

Since resolution in the direction of the depth of focus of the light beam is improved in accordance with the invention by providing a pin-hole member, reduction in the diameter of the light beam focused and reduction in the depth of focus by increasing the numerical aperture of the objective lens or reducing the wavelength of the light beam are not necessary. That is, the tracking error detecting section in the optical head according to the invention can provide a satisfactory tracking error signal without reducing the sensitivity of detection.

The above and other objects, features and advantages of the present invention will be more apparent from the following description.

BRIEF DESCRIPTION OF THE DRAWING

FIG. 2 is a block diagram of an optical head according to an embodiment of the invention;

DESCRIPTION OF THE PREFERRED EMBODIMENT

Figure 1:
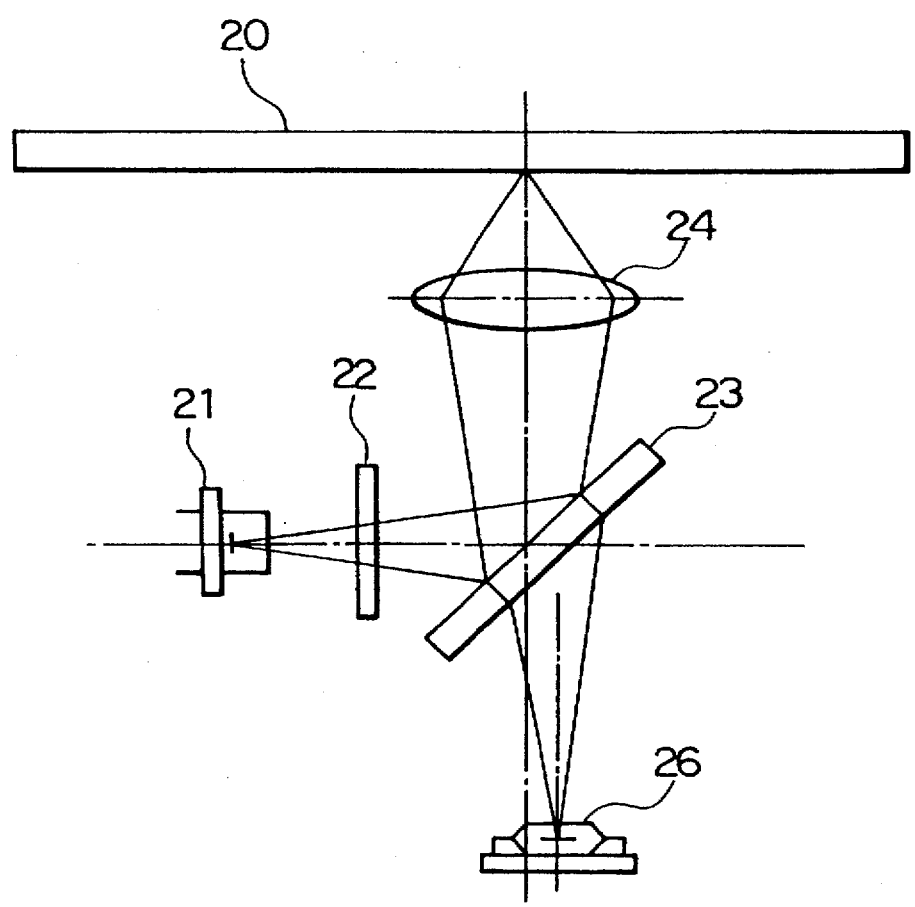
FIG. 1 is a block diagram of a conventional optical head.

Now, with reference to the drawings, an embodiment of the invention will be described. An optical head 10 shown in FIG. 2 according to the present embodiment is mounted on an optical disk drive, not shown, to provide a tracking error signal G1 and a focusing error signal G2.

The optical head 10 comprises a light source 11 which emits a light beam, a diffraction grating 12 which diffracts the light beam from the light source 11, a beam splitter or 45° half mirror 13 which reflects the diffracted light beams toward an optical disk file 20, an objective lens 14 which focuses the reflected beams onto the optical disk file 20, a pin-hole member 15 having three pin-holes formed therein each for passing a corresponding one of the reflected beams from the optical disk file, and photodetector 16 which receives the light beams passing through the pin-hole member 15 and generates detected electric signals S1 and S2 therefrom.

In the optical head 10 constructed in the manner mentioned above, a light beam from the light source 11 is focused onto the optical disk file 20 by the objective lens 14, which also serves as a focusing lens. Specifically, the reflected light beams from the optical disk file 20 again are transmitted through the objective lens 14, and the disposition of the objective lens 14 is made such that the light beams transmitted through the objective lens 14 are directed toward the photodetector 16. The objective lens 14 is arranged so as to be reciprocable in the direction perpendicular to the recording surface of the optical disk file 20 and also in the direction perpendicular to the tracks of the disk file 20 by a lens drive means, not shown. The lens drive means is controlled by a controller in the optical disk drive in accordance with detected signals G1 and G2 supplied from tracking error detecting section 17 and focusing error detecting section 18 which will be described later.

In addition to the described arrangement of the optical head 10, the photodetector 16 delivers detected signals S1 and S2 to the tracking error detecting section 17 and the focusing error detecting section 18 which calculate tracking error signal G1 and focusing error signal G2, respectively, on the basis of the detected signals S1 and S2.

The photodetector 16 includes three light receiving sections which receive reflected beams corresponding to the positive and negative first-order diffracted beams generated by the diffraction grating 12 and the zero-order diffracted beam. In response to the detected signal S1 from two of the light receiving sections of the photodetector 16 for the positive and negative first-order diffracted beams, the tracking error detecting section 17 subjects these detected signals to a subtraction operation so as to generate tracking error signal G1. The tracking error signal G1 is used to control the operation of the lens drive means, thereby allowing the optical head to follow the eccentricity of the optical disk file 20.

The zero-order diffracted beam reflected from the optical disk file 20 is transmitted through the 45° half mirror 13 before it reaches the photodetector 16, and passes through the pin-hole member 15 so as to be incident upon the light receiving sections of the photodetector 16 provided for the zero-order diffracted beams. The refraction of the zero-order diffracted beam during its passage through the 45° half mirror 13 produces an offset in the position of convergence in the left-and-right direction as viewed in FIG. 1 and the front-and-back direction through the plane of FIG. 2, or astigmatism. The light receiving section provided in the photodetector 16 for the zero-order diffracted beam is divided into four segments, which cause a change in the detected signal S2 in response to astigmatism. The focusing error detecting section 18, which receives the zero-order diffracted beam responds thereto and generates focusing error signal G2. The focusing error signal G2 is used to control the operation of the lens drive unit, thereby allowing the objective lens 14 to follow oscillation of the surface of the optical disk file 20.

The pin-hole member 15 is made of a thin film formed with pin-holes in central portions thereof. The pin-hole member 15 has three pin-holes at locations in front of the light receiving sections of the photodetector 16 where the reflected beams from the optical disk file 20 are imaged by the objective lens 4. Thus, the reflected beams from the optical disk file 20 are imaged during their passage through the respective pin-holes formed in the pin-hole member 15 and then are incident upon the photodetector 16.

It should be noted that the diffraction limit is doubled by receiving beams through the pin-hole member 15 in the detecting optical system as compared with the imaging optical system, specifically, by the diffraction executed by the objective lens 4 and the diffraction executed by the pin-hole member 15. A total point image distribution function is given by a product of the imaging optical system and the detecting optical system. Thus, since the squaring effect of the point image distribution function is a self-function in the spatial frequency domain, bandwidth is broadened to a double value.

It then follows that the resolution in direction of the depth of focus of the objective lens 14 (or the traveling direction of the reflected light) is doubled in bandwidth. In this manner, it is possible to reduce the difference in pit depth which can be detected to one-half the value used in a conventional optical head.

Figure 3A:
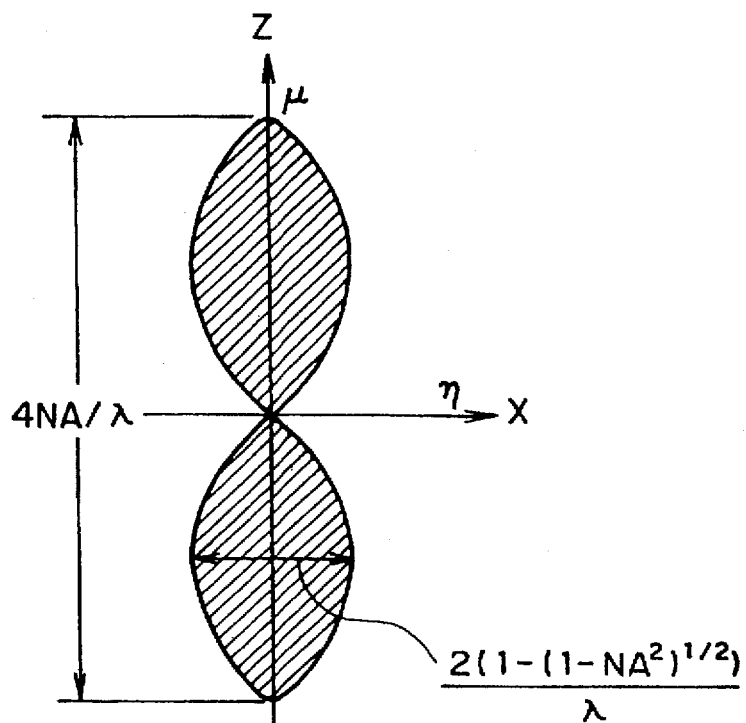
FIGS. 3A and 3B are two dimensional cross-sections among three dimensional Fourier transforms of three dimensional light intensity distributions in the vicinity of the focuses of the conventional optical head and the optical head of FIG. 2, respectively.
Figure 3B:
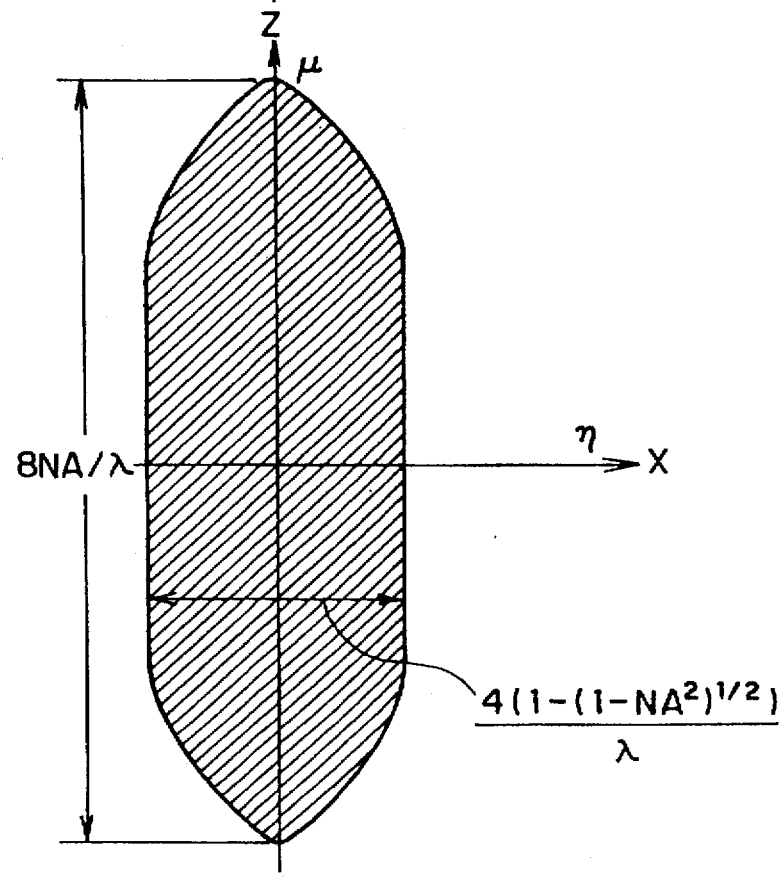

FIGS. 3A and 3B show two-dimensional profiles among three dimensional Fourier transforms of three dimensional light intensity distributions in the vicinity of focus at the photodetector 16 shown in FIG. 1 and FIG. 2, respectively. In this Figure, the Z-axis represents the direction of the depth of focus of the objective lens 14, and the X-axis represents a direction perpendicular to Z-axis, wherein $\mu$ and $\eta$ represent spatial frequencies in the X- and Z-axis directions. Spatial resolution in the direction of each spatial axis is determined by the bandwidth of that direction along the Fourier transform axis.

In a conventional optical system, as illustrated in FIG. 3A, the bandwidth in the $\mu$-direction is $4NA/\lambda$ while the bandwidth in the $\eta$-direction is $2(1-(1-NA^2)^{1/2})/\lambda$. In the optical system of the optical head 10 in FIG. 2, the diffraction effect is effective in the double sense since reflected light beams from the optical disk file 20 are detected through the pin-hole member 15 which is disposed at the imaged points of the reflected light beams in the detecting optical system. Accordingly, the total point image distribution function is given by the product of the imaging optical system and the detecting optical system. Accordingly, the bandwidth in the $\mu$-direction is $8NA/\lambda$ while the bandwidth in the $\eta$-direction is $4(1-(1-NA^2)^{1/2})/\lambda$. In other words, the bandwidth is broadened to a double value in both the $\mu$- and $\eta$-directions. Thus, the bandwidth in the direction of the depth of focus is broadened to a double value.

Figure 4A:
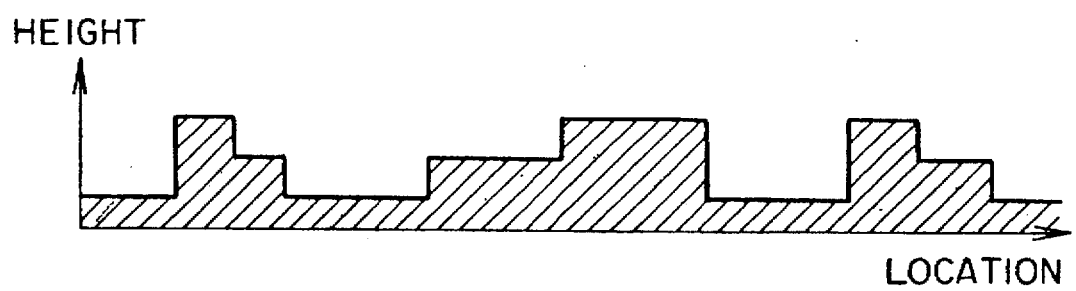
FIGS. 4A and 4B show cross-sections of a conventional disk file wherein binary data encoded pits are formed and of a disk file wherein quaternary data encoded pits are formed, respectively.
Figure 4B:
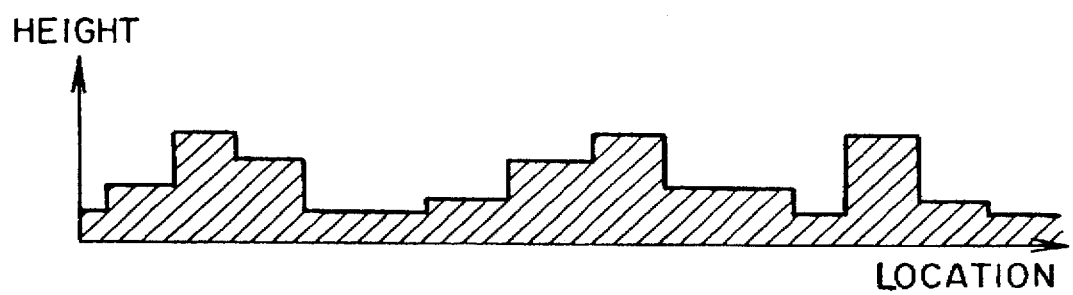
Figure 4C:
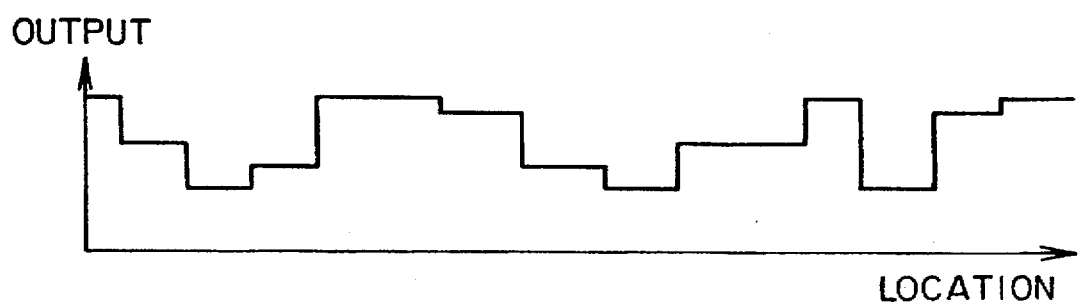
FIG. 4C is a diagram of a reproduced signal detected from the optical disk shown in FIG. 4B.

Pit depth in a disk having multi-valued data recorded therein is illustrated in FIGS. 4A and 4B. As compared with the difference in pit depth for a binary data encoded disk (FIG. 4A), unit pit depth in a quaternary data encoded disk is equal to one-half that of the binary data encoded disk as shown in FIG. 4B. This means that as compared with the depth of focus of an objective lens in a conventional optical head which is capable of reproduction from a binary data encoded disk as illustrated in FIG. 4A, reproduction from a quaternary data encoded disk as illustrated in FIG. 4B only requires a depth of focus which is one-half the depth of focus of the conventional head, as illustrated in FIG. 4C which shows the reproduced signal from the disk of FIG. 4B.

As described, the optical head 10 according to the present embodiment enables the resolution in the direction of the depth of focus to be improved to twice the conventional value, while using the objective lens 14 of the same numerical aperture as in the prior art, because the photodetector 16 receives reflected light through the pin-hole member 15. In this manner, difference in pit depth which can be detected can be reduced to one-half the conventional value. This allows an effective read-out of recorded data from the optical disk file which contains quaternary data as illustrated in FIG. 4B.

In operation of the optical system shown in FIG. 2, light emitted from the light source 11 is transmitted through the diffraction grating 12 as a zero- and a pair of first-order diffraction beams, and is then reflected by the 45° half mirror 13 so as to be focused onto the recording surface of the optical disk file 20 by the objective lens 14. The optical disk file 20 which is used with the present embodiment has quaternary data encoded pits therein. Reflected light from the optical disk file 20 is transmitted through the objective lens 14 again and is then imaged at the locations of the pin-holes formed in the pin-hole member 15, and subsequently pass through the pin-holes so as to be incident upon the photodetector 16.

During the process as described above, the positive and negative first-order diffracted beams, which are formed by the diffraction grating 12, are received by respective receiving sections in the photodetector 16 which generates therefrom a detected signal S1. In response to the detected signal S1, the tracking error detecting section 7 generates tracking error signal G1, which is delivered to a controller associated with the optical disk drive. If the presence of an error is found in the location of the diffracted beams, the lens drive means drives the objective lens 14 in a direction perpendicular to the track in the optical disk file 20, thereby adjusting the locations where the light beams irradiate the disk.

On the other hand, the zero-order diffracted beam, which is reflected from the optical disk file 20, produces an astigmatism in the 45° half mirror 13 and then is incident upon one of the receiving sections in the photodetector 16 which generates therefrom detected signal S2. In response to the detected signal S2, the focusing error detecting section 18 generates focusing error signal G2, which is applied to a controller associated with the optical disk drive. If the presence of an error is found in the depth of focus, the lens drive means drives the objective lens 14 in a direction perpendicular to the recording surface of the optical disk file 20, thereby adjusting the depth of the focus of the light beam.

Since the photodetector 16 receives the reflected beams from the optical disk file 20 through the pin-hole member 15, the diffraction limiting effect works in a double sense thereby improving the resolution in the direction of the depth of focus when receiving the reflected beams. In this manner, quaternary data from the optical disk file 20 is detected, and is delivered to a controller associated with the optical disk drive as a reproduced signal.

As mentioned, disposing pin-hole member 15 at a location in the vicinity the photodetector 16 in the present embodiment so that the reflected beams from the optical disk file 20 are received through the pin-holes allows the resolution in the direction of the depth of focus of the reflected beams to be improved by a factor of substantially two during the reception of such beams. In this manner, a difference in pit depth which can be detected can be reduced to one-half the conventional value. Hence, it is possible to read information from a high density optical disk file in which quaternary data is recorded at twice the density of a conventional optical disk file having binary data. Since resolution in the direction of the depth of focus is improved without reducing the spot diameter of the light beam which is focused onto the recording surface of the optical disk file, it is possible to detect tracking error and focusing error in a reliable manner.

Since above embodiment is described only for an example, the present invention is not limited to such an embodiment and it will be obvious to those skilled in the art that various modifications or alterations can be easily made based on the above embodiment within the scope of the present invention.

What is claimed is:

1. An optical head comprising a light source for emitting a light beam, a diffraction grating, disposed in association with said optical head, for diffracting the light beam to generate at least a pair of first-order diffracted beams, a first optical system for focusing the first-order diffracted beams onto an optical disk file having multi-value encoded data to generate a pair of reflected beams from the optical disk file, a second optical system for focusing the reflected beams at respective focal points to generate a pair of focused beams, a pin-hole member having a pin-hole at each of the focal points corresponding to each of said focused beams, a photodetector having at least a pair of detecting sections each for receiving a corresponding one of the pair of focused beams passing through respective pin-holes to generate detected signals based upon the respective focused beams, and a first calculating section for performing a calculation operation based upon the detected signals and for generating based upon said calculation operation a tracking error signal for tracking the optical head.

2. An optical head according to claim 1, wherein said first calculating section executes a subtraction operation on the detected signals.

3. An optical head according to claim 1, further comprising a second calculating section for generating a focusing error signal, wherein said diffraction grating is for permitting a zero-order diffracted beam to be transmitted therethrough, said pin-hole member and photodetector have another pin-hole and another detecting section for the zero-order diffracted beam, reflected from the optical disk file and transmitted through said first and second optical systems, said another detecting section generating from said zero-order diffracted beam another detected signal, and the another detected signal is supplied to said second calculating section.

* * * * *